US007317598B2

(12) United States Patent
Magnier

(10) Patent No.: US 7,317,598 B2
(45) Date of Patent: Jan. 8, 2008

(54) ELECTRIC TRANSFORMER EXPLOSION PREVENTION DEVICE

(76) Inventor: Philippe Magnier, 186 Avenue du Général de Gaulle, 78260 Acheres (FR)

( * ) Notice: Subject to any disclaimer, the term of this patent is extended or adjusted under 35 U.S.C. 154(b) by 34 days.

(21) Appl. No.: 11/473,339

(22) Filed: Jun. 22, 2006

(65) Prior Publication Data

US 2007/0001793 A1 Jan. 4, 2007

(30) Foreign Application Priority Data

Jun. 29, 2005 (FR) .................................. 05 06661

(51) Int. Cl.
*H02H 7/04* (2006.01)
*H01F 27/10* (2006.01)

(52) U.S. Cl. ............................ 361/37; 361/38; 336/58

(58) Field of Classification Search .................. 361/35, 361/37, 38; 336/61, 55, 57, 58
See application file for complete search history.

(56) References Cited

U.S. PATENT DOCUMENTS

| | | | | |
|---|---|---|---|---|
| 4,117,525 | A | 9/1978 | Moore | |
| 5,415,033 | A * | 5/1995 | Maresca et al. | 73/40.5 R |
| 5,534,853 | A | 7/1996 | Pioch | |
| 5,781,976 | A | 7/1998 | Stuhlbacher et al. | |
| 5,946,171 | A | 8/1999 | Magnier | |
| 6,804,092 | B1 | 10/2004 | Magnier | |
| 7,155,347 | B2 * | 12/2006 | Going et al. | 702/31 |
| 2003/0086218 | A1 * | 5/2003 | Folliot et al. | 361/37 |

FOREIGN PATENT DOCUMENTS

| | | |
|---|---|---|
| DE | 2624882 | 12/1977 |
| EP | 0238475 | 9/1987 |
| FR | 1355777 | 2/1963 |
| JP | 57007909 | 1/1982 |
| JP | 01-248603 | 10/1989 |
| JP | 05029155 | 2/1993 |
| JP | 2006-295017 | 10/2006 |
| WO | 94/28566 | 12/1994 |

OTHER PUBLICATIONS

Co-Pending U.S. Appl. No. 11/701,968, entitled "Device for Preventing the Explosion of an Element of an Electrical Transformer" filed Feb. 2, 2007; available in PAIR.

PCT Search Report and Written Opinion for International application No. PCT/FR2006/002421 mailed Jul. 3, 2007, 11 pages.

(Continued)

*Primary Examiner*—Anh Mai
(74) *Attorney, Agent, or Firm*—Meyertons, Hood, Kivlin, Kowert & Goetzel, P.C.; Eric B. Meyertons

(57) ABSTRACT

A device for preventing the explosion of an electric transformer equipped with a tank filled with combustible coolant fluid, includes a pressure relief element to decompress the tank, a reservoir arranged downstream of the pressure relief element and at least one stopper valve on the reservoir such that the reservoir is hermetic in order to collect a fluid that passes through the pressure relief element.

12 Claims, 9 Drawing Sheets

OTHER PUBLICATIONS

French Search Report for FR 0506661 mailed Feb. 17, 2006.
JAGOB "The ELPYR-Fire Fighting System for Oil Immersed Transformers" OZE (1988) 41(11), 388.
Elektromotorenwerk Barleben Brochure, Figures.
ELIN Stufenschalter fur Transformatoren, Techincal Reference, see Figures.
ELIN ELPYR System-E, Brouchure.
Widenhorn et al. "Minimised Outage Time of Power Plant Units After Step Up Transformer Failure" Proceedings of Power Gen '94-Asia (1994) vol. II, p. 23-25.
Merlin Gerin "HV Three Phase SF6 Gas Insulated Switchgear". Schaltanlagen, ABB Schaltanlagen GmbH.

* cited by examiner

ELECTRIC TRANSFORMER EXPLOSION PREVENTION DEVICE

BACKGROUND OF THE INVENTION

1. Field of the Invention

The present invention concerns the field of prevention of explosions of electric transformers cooled by a volume of combustible fluid.

2. Description of the Relevant Art

Electric transformers sustain losses both in the windings and in the iron part, requiring the heat produced to be dissipated. Thus, high-power transformers are generally cooled by a fluid such as oil. The oils used are dielectrics and are capable of igniting above a temperature of about 140° C. Since transformers are very expensive devices, particular attention must be paid to protecting them.

An insulation fault generates, in the first instance, a strong electric arc prompting action by the electrical protection systems which trigger the transformer power cubicle (circuit breaker). The electric arc also results in a diffusion of energy causing gases to be discharged through decomposition of the dielectric oil, in particular hydrogen and acetylene.

After the gas discharge, the pressure inside the transformer tank increases very rapidly, leading to an often very violent deflagration. The deflagration causes significant tearing of the mechanical linkages of the transformer tank (bolts, welds) placing the said gases in contact with the oxygen in ambient air. Since acetylene self-ignites in the presence of oxygen, a fire breaks out immediately and spreads to other items of equipment on the site which are also likely to contain large quantities of combustible substances.

Explosions are caused by insulation ruptures due to short-circuits caused by overloads, voltage surges, a gradual deterioration of the insulation, insufficient oil level, the appearance of water or mould, or a failure of an insulation component.

There are known, in the prior art, fire extinguishing systems for electric transformers which are activated by fire detectors. However these systems operate with a significant lag, when the transformer oil is already burning. It was therefore accepted to merely restrict the fire outbreak to the equipment concerned so as not to spread the fire to the neighbouring installations.

To slow down the decomposition of the dielectric fluid due to an electric arc, silicon oils can be used instead of conventional mineral oils. However, the explosion of a transformer tank due to the increase in internal pressure is delayed for only an extremely short time period, in the order of a few milliseconds. This time period did not allow prevention of the explosion. Silicon oils are expensive.

There is known through document WO-A-97/12379 a method for preventing explosion and fire in an electric transformer equipped with a tank filled with combustible coolant fluid, by the detection of a rupture in the electrical insulation of the transformer using a pressure sensor, depressurization of the coolant fluid contained in the tank using a valve, and cooling of the hot parts of the coolant fluid by injecting a pressurized inert gas in the bottom of the tank in order to agitate the said fluid and to prevent oxygen from penetrating the transformer tank. This method is satisfactory and prevents the transformer tank from exploding.

Document WO-A-00/57438 discloses a rupture element with rapid opening for an electric transformer explosion prevention device.

SUMMARY OF THE INVENTION

Described herein is an improved device for an extremely rapid decompression of the tank in order to further increase the probability of preserving the integrity of the transformer, the on-load tap changers and the bushings while using parts of simple structure.

A device for preventing the explosion of an electric transformer equipped with a tank filled with combustible coolant fluid includes a pressure relief element arranged on an outlet of the tank to decompress the tank, a reservoir arranged downstream of the pressure relief element and at least one manually triggered valve fitted at the outlet of the reservoir such that the reservoir is hermetic in order to collect a fluid that passes through the pressure relief element. Thus the fluid is prevented from spreading to a place where this would not be desirable for reasons of safety, pollution or for other reasons. This is because the fluid, which may be a mixture of liquid and gas, exhibits a risk of igniting when enough oxygen is available to fulfil the conditions for ignition and explosion. Furthermore, certain components of this fluid could prove to be harmful to humans and/or to the environment, in particular in a confined atmosphere.

Advantageously, an automatic pressure relief element is fitted at the outlet of the reservoir. The pressure relief element may include a valve capable of being opened when a pressure threshold is exceeded in order to prevent an explosion of the reservoir. The relief by the valve is then limited to the quantity of fluid needed to revert to a pressure lower than the trigger threshold of the said valve. An additional pipe may be arranged downstream of the pressure relief element. The additional pipe is for directing the fluid to the most appropriate place. The additional pipe may be equipped with cooling means. The temperature of the fluid can thus be reduced before it escapes, thereby reducing the risk of ignition. The reservoir may be equipped with cooling means, for example in the form of a gas expansion valve.

Advantageously, a flame arresting element is fitted to the additional pipe. The flame arresting element may take the form of a fluid check valve preventing oxygen from entering the pipe. The flame arresting element may also include a part capable of shutting off the said pipe in the presence of a flame. The pressure relief element may also include a solenoid valve controlled by an external control unit or a temperature detector next to the said valve, capable of ordering the closure of the said solenoid valve in the presence of combustion.

The reservoir may be equipped with cooling means.

In one embodiment, the device includes a vacuum pump connected to the reservoir. The reservoir can thus be placed at a much lower pressure than the ambient atmosphere and the normal pressure prevailing in the transformer tank, and this facilitates decompression of the tank and reduces the amount of oxygen present in the tank.

In one embodiment, the device includes a gas pump and an auxiliary reservoir. The gas pump is arranged between the reservoir and the auxiliary reservoir and is for transferring, for example together with flushing with nitrogen at the same time as pumping, combustible and/or toxic gases from the reservoir to the auxiliary reservoir which can then be isolated from the reservoir and from the gas pump. The gas pump may include a compressor and the auxiliary reservoir may include a pressurized enclosure. The combustible toxic gases can thus be stored in a reduced volume.

Advantageously, the device includes a depressurization chamber arranged between the pressure relief element and the reservoir. The depressurization chamber exhibits an extremely low head loss and may be arranged immediately downstream of the pressure relief element so as to provide for a rapid decompression of the transformer tank. The reservoir may be located at a distance from the depressurization chamber that is much greater than the distance between the transformer tank and the depressurization chamber. The depressurization chamber may take the form of a portion of tubing having a diameter that is much greater than the diameter of the pipe. The depressurization chamber may advantageously be intended to withstand high pressures and mechanical loads that are greater than those for which the reservoir is designed.

In one embodiment, the pressure relief element includes a perforated rigid disc and an impermeable membrane. The pressure relief element may also include a slotted disc. The discs may be domed in the direction of flow of the fluid. The slotted disc may include a plurality of lobes separated from one another by slots that are approximately radial. The lobes are connected to an annular part of the disc and are capable of resting one on the other by means of fastening tabs in order to withstand a pressure external to the transformer tank that is greater than the internal pressure. The perforated rigid disc may be equipped with a plurality of through-holes, arranged near the centre of the said disc and from which the radial slots extend. The impermeable membrane may consist of a thin polytetrafluoroethylene-based layer.

The slotted disc may include a plurality of portions capable of resting one on the other during a thrust in an axial direction.

In one embodiment, the pressure relief element additionally includes a disc for protecting the impermeable membrane, the protective disc including a thin precut sheet. The protective disc may be produced from a polytetrafluoroethylene sheet having a greater thickness than the impermeable membrane. The precut sheet may take the form of a portion of a circle. The perforated rigid disc may include a plurality of radial slots, distinct from each other.

Advantageously, the device includes a plurality of pressure relief elements intended to be connected to a plurality of transformers. Thus a single reservoir can serve to prevent the explosion of a plurality of transformers, each transformer being associated with at least one pressure relief element.

The device may include rupture detection means integrated with the pressure relief element, thus providing a detection of the tank pressure with respect to a predetermined pressure relief threshold. The rupture detection means may include an electrical wire intended to break at the same time as the pressure relief element. The electrical wire may be bonded to the pressure relief element, preferably on the opposite side with respect to the fluid. The electrical wire may be covered by a protective film.

The device may include a plurality of pressure relief elements intended to be connected to a plurality of oil capacitors of at least one transformer.

The method for preventing the explosion of an electric transformer equipped with a tank filled with combustible coolant fluid includes the tank being decompressed by a pressure relief element, the fluid that passes through the pressure relief element being collected by a hermetic reservoir, and gases being removed by at least one manually triggered valve.

The explosion prevention device is designed for a transformer's main tank, for the tank of the on-load tap changer or changers, and for the tank of the electrical bushings, this latter tank also referred to as an "oil box". The role of the electrical bushings is to isolate a transformer's main tank from the high and low voltage lines to which the transformer windings are connected via output conductors. Each output conductor is surrounded by an oil box containing a certain amount of insulating fluid. The insulating fluid in the bushings and/or oil boxes is an oil that is different from that of the transformer. Nitrogen injection means may be provided, connected to the transformer tank and intended to be triggered, manually or automatically, when a fault is detected. Injecting nitrogen can encourage the evacuation of combustible gases from the transformer tank to the reservoir and, where necessary, to the auxiliary reservoir.

The explosion prevention device may be equipped with means for detecting the triggering of the transformer power cubicle and a control unit which receives the signals transmitted by the transformer's sensor means and which is capable of transmitting the control signals.

The probability that combustible and/or toxic fluid escapes to the outside of the device is greatly reduced, thus resulting in reducing the risks of igniting the said gases or the risk of an operator located nearby being poisoned.

The explosion prevention device is particularly well suited for electric transformers located in confined areas, for example tunnels, mines or underground in a built-up area.

BRIEF DESCRIPTION OF THE DRAWINGS

The present invention will be better understood by studying the detailed description of a few embodiments given by way of entirely non-limiting example, and illustrated by the accompanying drawings in which.

Figure 1:
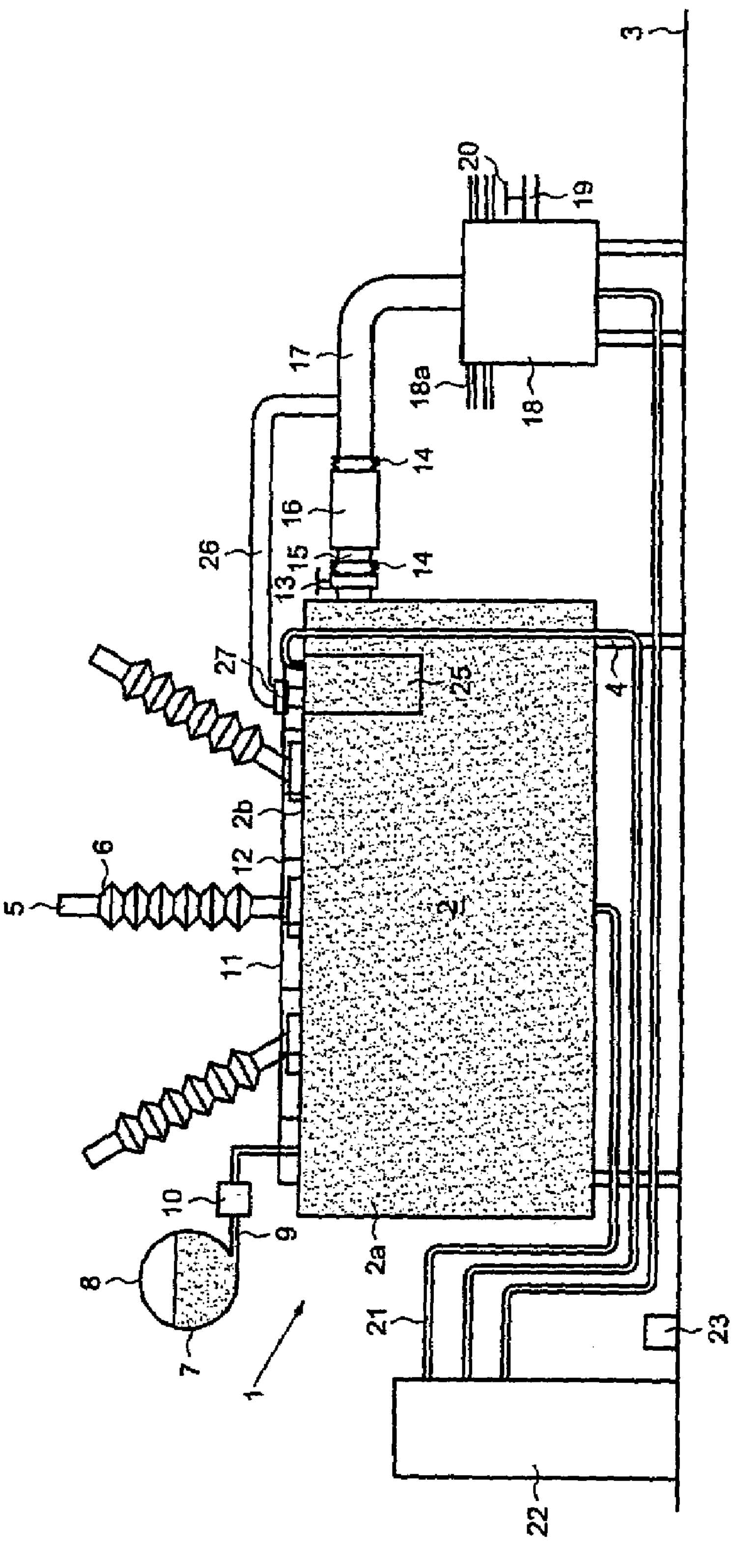
FIG. 1 is a schematic view of a fire prevention device.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As illustrated in the figures, the transformer 1 includes a tank 2 resting on the ground 3 by means of feet 4 and is supplied with electrical energy by electrical lines 5 surrounded by insulators 6. The tank 2 includes a body 2*a* and a lid 2*b*.

The tank 2 is filled with coolant fluid 7, for example dielectric oil. To ensure a constant level of coolant fluid 7 in the tank 2, the transformer 1 is equipped with a conservator 8 connected to the tank 2 by a pipe 9.

The pipe 9 is provided with an automatic check valve 10 which shuts off the pipe 9 as soon as it detects a rapid movement of the fluid 7. Thus, during a depressurization of the tank 2, the pressure in the pipe 9 falls abruptly causing the fluid 7 to start flowing, which flow is rapidly stopped by the blocking action of the automatic check valve 10. Thus the fluid 7 contained in the conservator 8 is prevented from being drained.

The tank 2 is also equipped with one or more fire detection cables 11. In the embodiment represented, a fire detection cable 11 is fitted above the tank 2 and is supported by blocks 12 resting on the lid 2*b*. A distance of a few centimetres separates the cable 11 from the lid 2*b*. The cable 11 may include two wires separated by a synthetic membrane with a low melting point, the two wires coming into contact when the membrane has melted. The cable 11 may be laid out in a rectangular path near the edges of the tank 2.

The tank 2 may include a sensor, also called a Buchholz, for detecting the presence of vapour from the coolant fluid, fitted at a high point of the tank 2, generally on the pipe 9. A rupture in the electrical insulation results in the discharge of vapour from the fluid 7 in the tank 2. A vapour sensor can be used to detect a rupture in the electrical insulation with a certain delay.

The transformer 1 is powered by a power cubicle, not represented, which includes power cut-off means such as circuit breakers and which is equipped with trigger sensors.

The prevention device includes a valve 13 fitted to an outlet of the tank 2 arranged at a high point of the body 2*a*, a rupture element 15 the breakage of which is used to detect without delay the variation of pressure due to the rupture in the electrical insulation of the transformer, and two vibration-absorbing elastic sleeves 14, one being arranged between the valve 13 and the rupture element 15. The prevention device also includes a depressurization chamber 16 having a diameter greater than that of the rupture element 15, fitted downstream of the rupture element 15 and a drainage pipe 17 supported by a reservoir 18 intended to collect the fluids from the tank 2 after breakage of the rupture element 15 and intended to separate the liquid fraction from the gaseous fraction. The pipe 17 is fitted between the depressurization chamber 16 and the reservoir 18. The other elastic sleeve 14 is fitted between the depressurization chamber 16 and the pipe 17.

The reservoir 18 may be equipped with cooling fins 18*a*. The reservoir 18 is equipped with piping 19 for evacuating gases given off by the oil. The piping 19 may be connected temporarily to a mobile vessel in order to drain the reservoir 18. The tank 2 is thus immediately depressurized and later partially emptied into the reservoir 18. The rupture element 15 may be intended to be opened at a determined pressure of less than 1 bar, for example between 0.6 bar and 1.6 bar, preferably between 0.8 bar and 1.4 bar.

A valve 20 is arranged in the piping 19 to prevent oxygen in the air from entering, which could feed the combustion of the gases and that of the oil in the reservoir 18 and in the tank 2, and to prevent the uncontrolled exit of gas or liquid. The valve 20 may be manual or motorized with manual control. The valve 20 is always closed to keep the reservoir hermetic, except when the reservoir 18 is emptied of the gases present in it, or when purging of the gases is carried out.

The tank 2 includes means for cooling the fluid 7 by injecting an inert gas such as nitrogen in the bottom of the tank 2. The inert gas is stored in a pressurized reservoir equipped with a valve, an expansion valve or a pressure reducer and a hose 21 conveying the gas to the tank 2. The pressurized reservoir is housed in a cabinet 22.

The cable 11, the rupture element 15, the vapour sensor, the trigger sensors, the valve 13 and the stopper valve 20 are connected to a control unit 23 intended to monitor the operation of the device. The control unit 23 is equipped with information processing means receiving signals from the various sensors and capable of transmitting control signals in particular for the valve 20.

In normal operation, the valve 13 is open and the rupture element 15 is intact, i.e. closed. The valve 20 is also closed. The valve 13 may be closed for maintenance operations, with the transformer 1 being off. The elastic sleeve 14 is capable of absorbing the vibrations of the transformer 1 which are produced when it is operating and during a short-circuit, in order to prevent the vibrations from being transmitted to other components, in particular to the rupture element 15. The depressurization chamber 16 enables a sharp fall in pressure when the rupture element 15 breaks, owing to extremely reduced head losses.

When the rupture element 15 breaks following an electrical fault in the transformer 1, the pressure in the tank 2 reduces. A jet of gas and/or of liquid passes through the rupture element 15 and spills into the depressurization chamber 16, and then flows into the pipe 17 to the reservoir 18. The role of the depressurization chamber 16 can prove to be particularly important in the first few milliseconds following the breakage of the rupture element 15.

Later, inert gas, for example nitrogen, may be injected in the bottom of the tank 2 in order to flush out the combustible gases likely to remain in the tank 2 and to cool the hot parts of the transformer to stop gases being produced. The injection of inert gas may be triggered from a few minutes to a few hours after the breakage of the rupture element 15; preferably a sufficient settling period, in order that the gases and liquids are appropriately separated, is provided. In addition, it is possible to wait for the reservoir 18 and its contents to cool. The said combustible gases are evacuated to the reservoir 18. A mobile vessel may be connected to the piping 19 in order to receive the fluids present in the reservoir 18 after the valve 20 is opened. The reservoir 18 may be purged with an inert gas. The rupture element 15 can then be replaced. For safety reasons, the reservoir for the inert gas is intended to be able to inject inert gas for a period of about 45 minutes, which may prove to be useful for cooling the oil and the hot parts by agitating the oil, and therefore stopping gases from being produced by the decomposition of the oil.

The transformer 1 may be equipped with one or more on-load tap changers 25 serving as interfaces between the said transformer 1 and the electrical power network to which it is connected in order to provide a constant voltage despite variations in the current supplied to the network. The on-load tap changer 25 is connected by a drainage pipe 26 to the pipe 17 intended for the draining. This is because the on-load tap changer 25 is also cooled by an inflammable coolant fluid. Due to its high mechanical strength, the explosion of an on-load tap changer is extremely violent and can be accompanied by the ejection of jets of burning coolant fluid. The pipe 26 is equipped with a pressure relief element 27 capable of tearing in the event of a short-circuit and therefore of excess pressure inside the on-load tap changer 25. Thus the tank of the said on-load tap changer 25 is prevented from exploding.

A transformer explosion prevention device is thus provided which detects ruptures in insulation extremely quickly and simultaneously takes action to limit the resulting consequences. As a result, the transformer, on-load tap changer and bushings are saved and damage related to the insulation fault is minimized.

Figure 2:
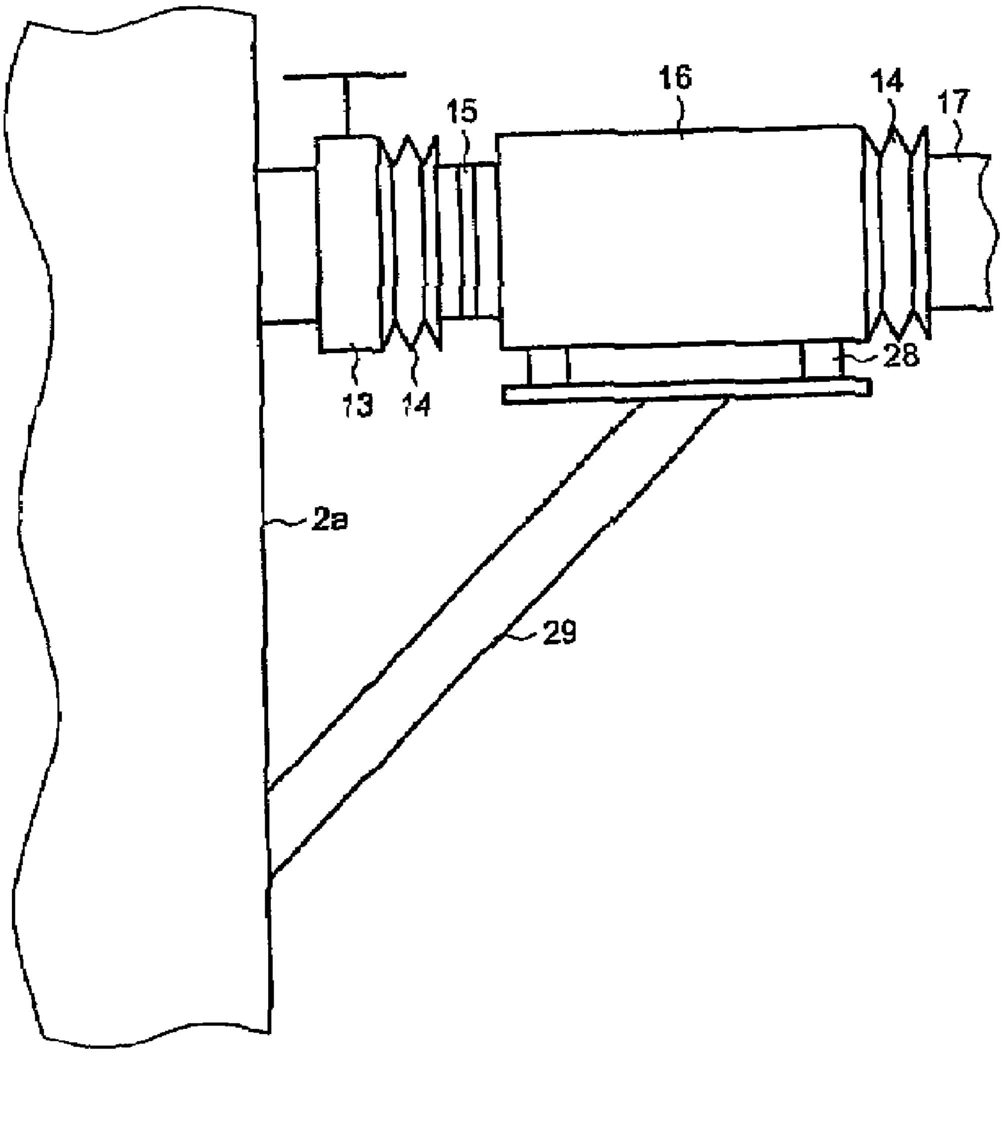
FIG. 2 is a detailed view of FIG. 1.

As FIG. 2 shows, the depressurization chamber 16 rests on four dampers 28 supported by a bracket 29 fixed to the body 2*a* of the tank 2. Mechanical isolation is thus created between the vibrations from the transformer 1 during normal operation and the depressurization chamber 16 on the one hand, and between the deformation of the transformer 1 during a rupture in the insulation on the other hand.

Figure 3:
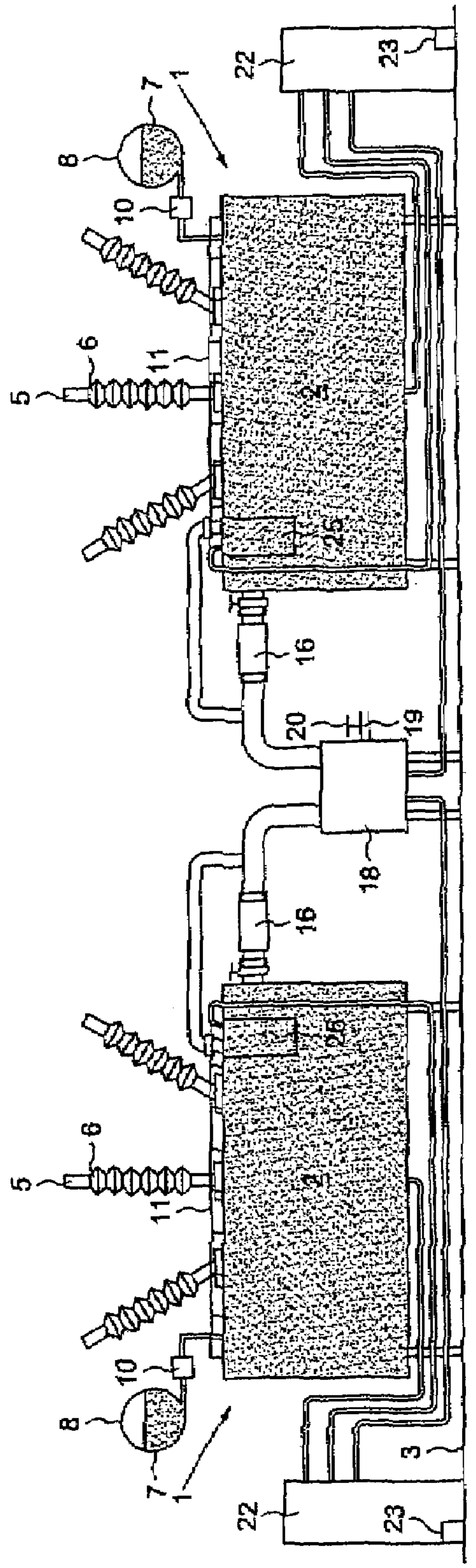
FIG. 3 is a schematic view of a fire prevention device associated with several transformers.

In the embodiment illustrated in FIG. 3, several neighbouring transformers 1 are connected to a reservoir 18. In other words, several prevention devices for several different transformers can have one common reservoir 18. This proves to be particularly advantageous in confined areas where the available space is restricted.

Figure 4:
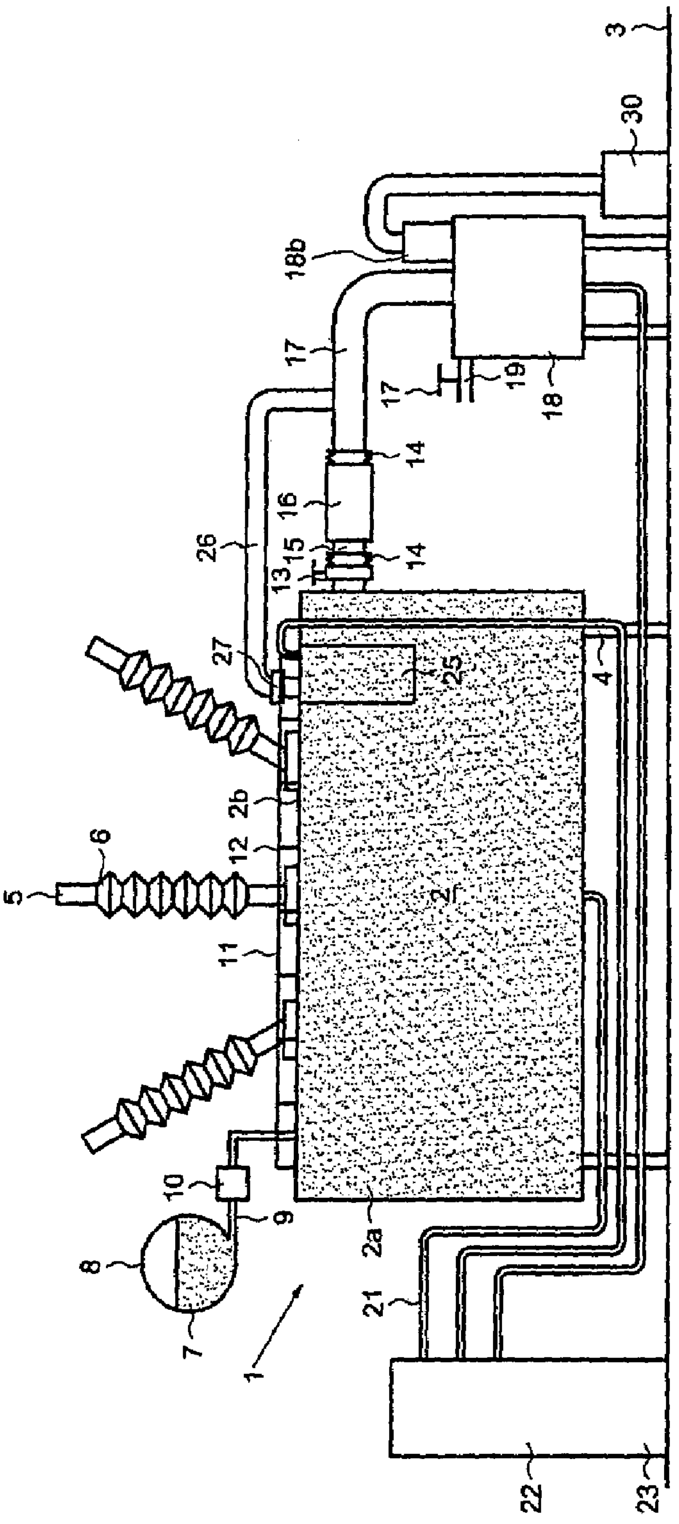
FIG. 4 shows a variant of FIG. 1.

In the embodiment illustrated in FIG. 4, the prevention device additionally includes a vacuum pump 30 connected to the reservoir 18 by a pipe. The reservoir 18 may be equipped with a cooling system 18*b*, for example by nitrogen expansion. When the prevention device is being placed in operation, the vacuum pump 30 is activated and creates a partial vacuum in the reservoir 18, and then it is stopped. After the rupture element 15 is broken, the mass of gas from the tank 2 that is capable of being stored in the reservoir 18 is increased at maximum equal pressure. Depressurization can therefore be facilitated. The reservoir may be of reduced volume thereby resulting in a gain of space.

Figure 5:
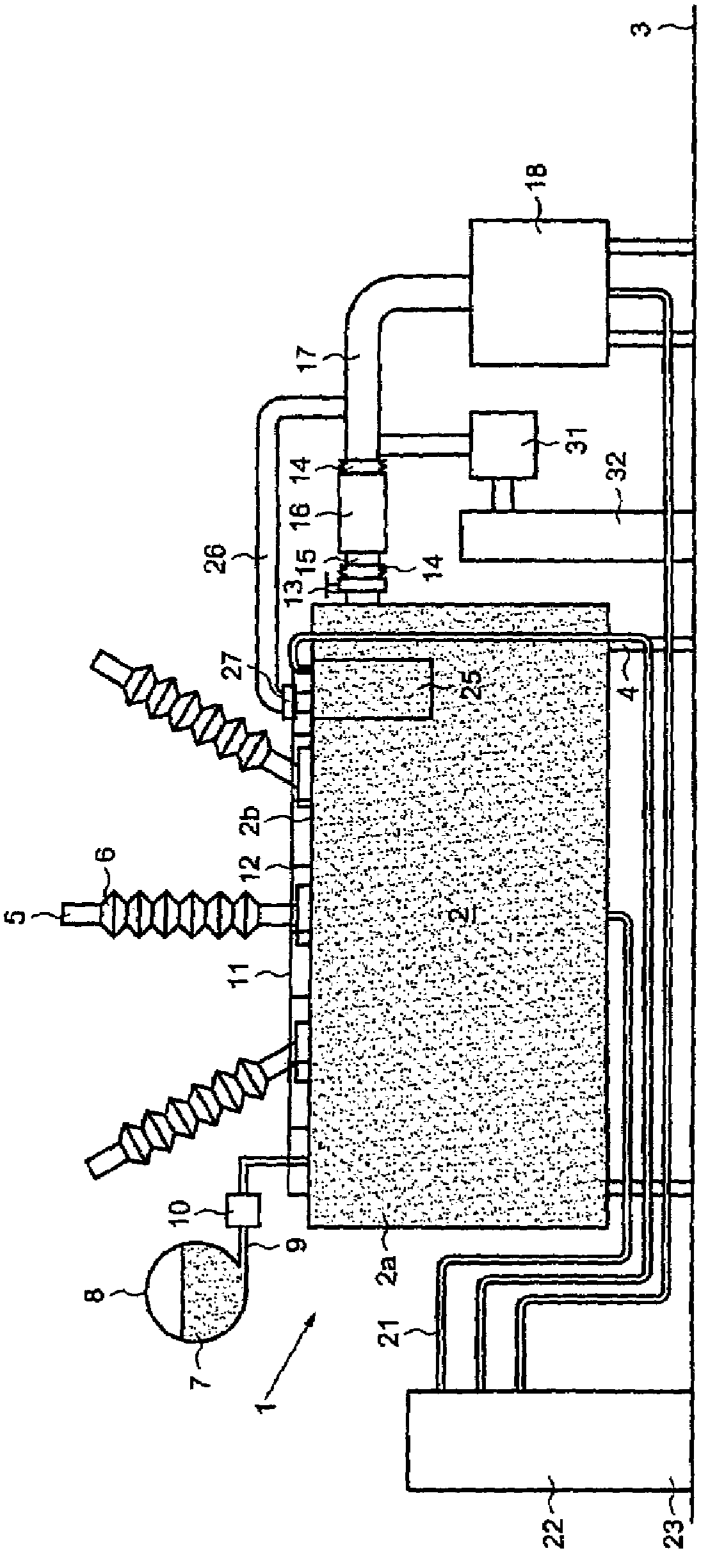
FIG. 5 shows a variant of FIG. 1.
Figure 6:
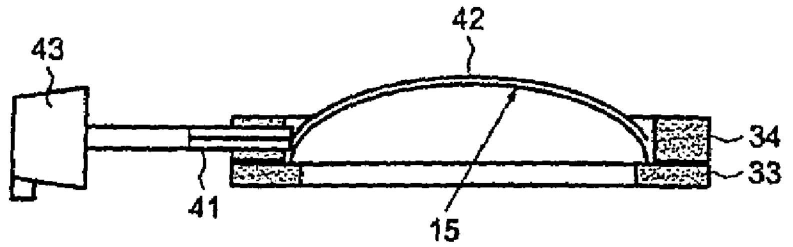
FIG. 6 is a cross-sectional view of a rupture element.
Figure 7:
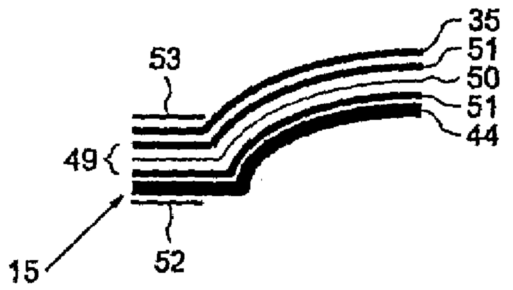
FIG. 7 is an enlarged partial view of FIG. 6.
Figure 8:
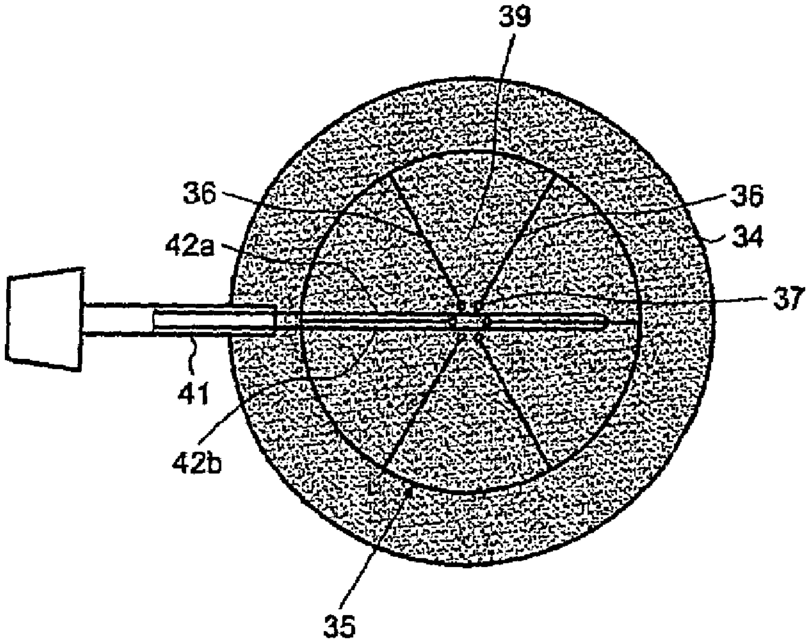
FIG. 8 is a view from above corresponding to FIG. 6.
Figure 9:
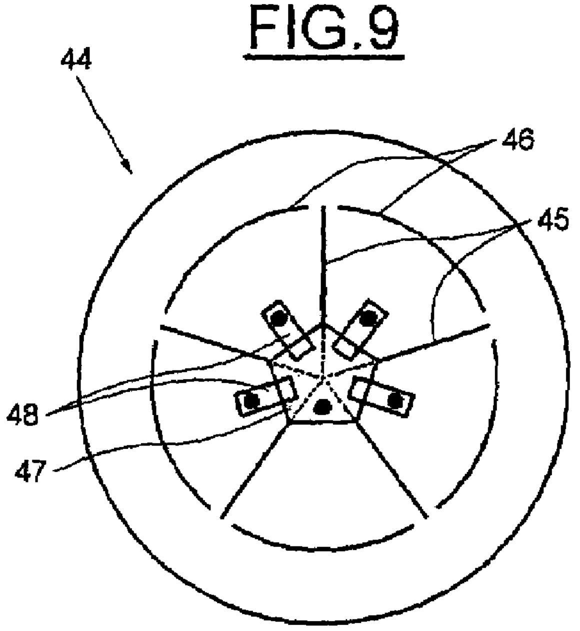
FIG. 9 is a view from beneath corresponding to FIG. 6.

In the embodiment illustrated in FIG. 5, the prevention device additionally includes a gas pump 31 connected to the pipe 17 or to the reservoir 18 and opening out into a bottle 32 that withstands the pressure. After the rupture element 15 is broken, and there has been a flow for a sufficient period of time for the gases to cool, the gas pump 31 is activated and pumps the gases present in the reservoir 18. The reservoir 18 can thus be emptied of the gas contained in it, the said gas able to be a mixture of inert gas and combustible gas. After the gas pump 31 is stopped, the bottle 32 can easily be removed and transported over a distance. This embodiment is particularly suitable for transformers installed in mines or tunnels.

As FIGS. 6 to 9 show, the rupture element 15 is of convex domed circular shape and is intended to be fitted to an outlet orifice, not represented, of a tank 2 clamped between two disc-shaped flanges 33, 34. The relief element 15 includes a retaining part 35 in the form of a thin metal sheet, for example made of stainless steel, aluminium or aluminium alloy. The thickness of the retaining part 35 may be between 0.05 mm and 0.25 mm.

The retaining part 35 has radial grooves 36 dividing it into several portions. The radial grooves 36 are formed in recesses in the thickness of the retaining part 35 such that a rupture is made by the tearing of the retaining part 35 at its centre and such that this happens without fragmentation in order to prevent fragments of the relief element 15 from being broken off and moved by the fluid passing through the relief element 15 and running the risk of damaging a pipe located downstream.

The retaining part 35 is provided with through-holes 37 of very small diameter arranged one per groove 36 near the centre. In other words, several holes 37 are arranged hexagonally. The holes 37 form tear initiation sites of low strength and ensure that the tearing starts at the centre of the retaining part 35. The formation of at least one hole 37 per groove 36 ensures that the grooves 36 will separate simultaneously, providing the largest possible passage cross section. As a variant, a number of grooves 36 different from six could be envisaged, and/or several holes 37 per groove 36. The impermeable coating 50 is capable of blocking the holes 37.

The break pressure of the relief element 15 is determined, in particular, by the diameter and position of the holes 37, the depth of the grooves 36, and the thickness and composition of the material forming the retaining part 35. Preferably, the grooves 36 are formed over the entire thickness of the retaining part 35. The remainder of the retaining part 35 may have a constant thickness.

Two adjacent grooves 36 form a triangle 39 which during rupture will be separated from the neighbouring triangles by the tearing of the material between the holes 37 and will be deformed towards the downstream direction by folding. The triangles 39 fold without tearing to prevent the breaking off of the said triangles 39 which are capable of damaging a downstream pipe or disturbing the flow in the downstream pipe thus increasing the head loss and slowing down the depressurization process on the upstream side. The number of grooves 36 also depends on the diameter of the retaining element 15.

The flange 34 arranged downstream of the flange 33 has a radial hole drilled through it, into which hole there is arranged a protective tube 41. The rupture detector includes an electrical wire 42 fixed to the retaining part 35 on the downstream side and arranged in a loop. The electrical wire 42 extends into the protective tube 41 as far as a connection unit 43. The electrical wire 42 extends over almost the entire diameter of the retaining element 15, with a portion of wire 42*a* arranged on one side of a groove 36 parallel to the said groove 36 and the other portion of wire 42*b* arranged radially on the other side of the same groove 36 parallel to the said groove 36. The distance between the two wire portions 42*a*, 42*b* is small. This distance may be less than the maximum distance separating two holes 37 such that the wire 42 passes between the holes 37.

The electrical wire 42 is covered by a protective film which serves both to prevent it from corroding and to bond it to the downstream face of the retaining part 35. The composition of this film will also be chosen to avoid modifying the rupture pressure of the rupture element 15. The film may be made of embrittled polyamide. The breakage of the rupture element necessarily leads to the cutting of the electrical wire 42. This cutting can be detected in an extremely simple and reliable manner by the interruption of a current flowing through the wire 42 or by the voltage difference between the two ends of the wire 42.

The rupture element 15 also includes a strengthening part 44 arranged between the flanges 33 and 34 in the form of a metal sheet, for example made of stainless steel, aluminium, or aluminium alloy. The thickness of the strengthening part 44 may be between 0.2 mm and 1 mm.

The strengthening part 44 includes a plurality of lobes, for example five, separated by radial grooves 45 formed over their entire thickness. The lobes are connected to an external annular edge, a groove 46 in the form of an arc of a circle being formed over the entire thickness of each lobe except near neighbouring lobes, thus giving the lobes a capability of being deformed axially. One of the lobes is connected to a central polygon 47, for example by welding. The polygon 47 closes the centre of the lobes and rests on hooks 48 fixed to the other lobes and axially offset with respect to the lobes such that the polygon 47 is arranged axially between the lobes and the corresponding hooks 48. The polygon 47 may come into contact with the bottom of the hooks 48 to press axially thereon. The strengthening part 44 provides good axial strength in one direction and a very low axial strength in the other direction, the direction of breakage of the rupture element 15. The strengthening part 44 is particularly useful when the pressure in the tank 2 of the transformer 1 is lower than that of the depressurization chamber 16, which may arise if a partial vacuum is created in the tank 2 for the filling of the transformer 1.

Between the retaining part 35 and the strengthening part 44, there may be arranged an impermeable part 49 including a thin film 50 of impermeable synthetic material, for example based on polytetrafluoroethylene surrounded on each face by a thick film 51 of precut synthetic material preventing the thin film 50 from becoming perforated by the retaining part 35 and the strengthening part 44. Each thick film 51 may include synthetic material for example based on polytetrafluoroethylene with a thickness in the order of 0.1 mm to 0.3 mm. The thick films 51 may be precut in the form of arcs of a circle of about 330°. The thin film 50 may have a thickness in the order of 0.005 mm to 0.1 mm.

The rupture element 15 provides good resistance to the pressure in one direction, a calibrated resistance to the pressure in the other direction, excellent impermeability and low lag upon breakage.

To improve the impermeability, the rupture element 15 may include a washer 52 arranged between the flange 33 and the retaining part 35 and a washer 53 arranged between the flange 34 and the strengthening part 44. The washers 52 and 53 may be made of a polytetrafluoroethylene-based material.

In addition, means for cooling the fluids in the prevention device may be provided. The cooling means may include fins on the pipe 17 and/or the reservoir 18, an air conditioner for the reservoir 18, and/or a reserve of liquefied gas, for example nitrogen, the expansion of which is capable of cooling the reservoir 18.

Figure 10:
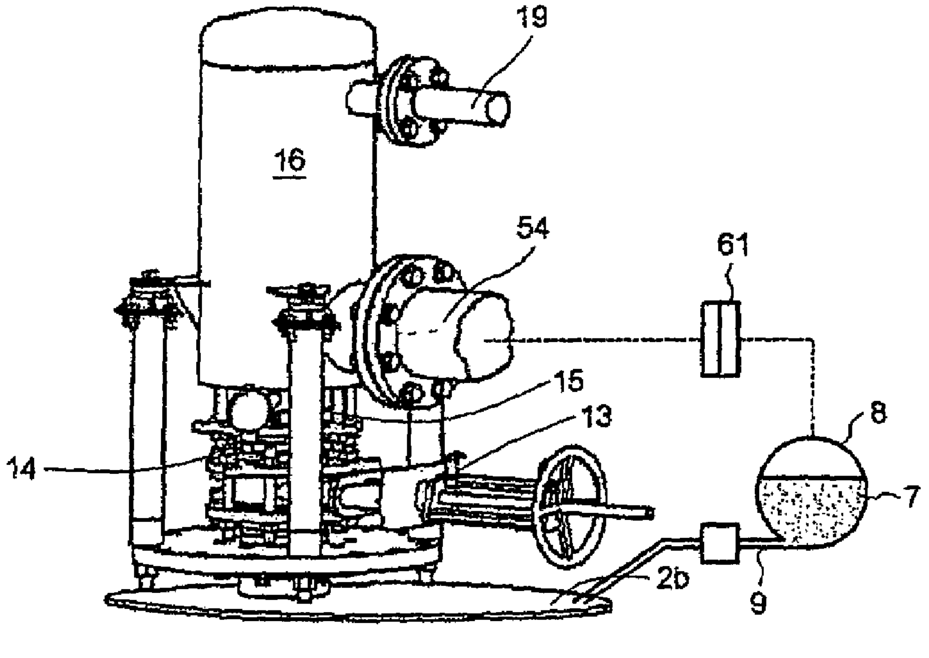
FIG. 10 is a schematic view of a fire prevention device with a vertical depressurization chamber.
Figure 11:
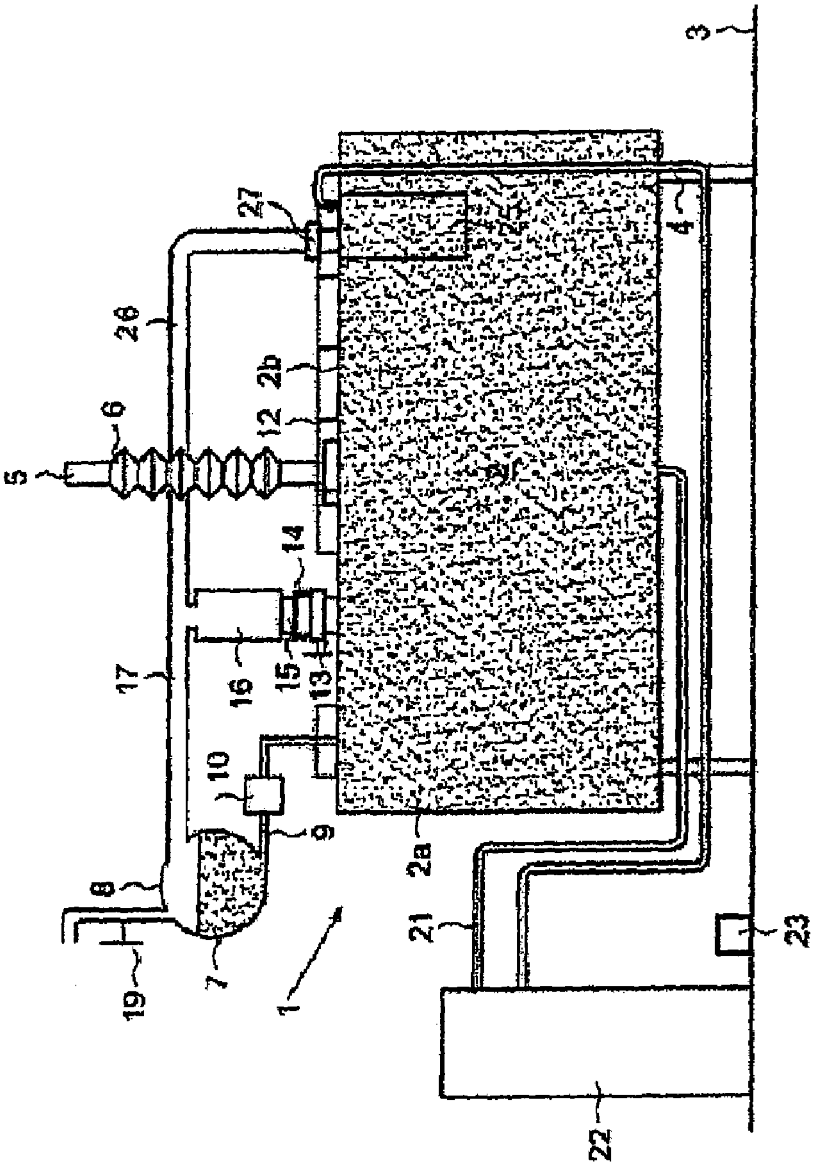
FIG. 11 is an overall view corresponding to FIG. 10.

In the embodiment of FIGS. 10 and 11, the prevention device is arranged approximately vertically, for example on the lid 2*b* of the tank 2. The depressurization chamber 16 includes a vertical axis cylinder closed at its ends while being connected to the rupture element 15, having a diameter greater than that of the rupture element 15, and fitted downstream of the rupture element 15. The depressurization chamber 16 also forms the collection reservoir. The pipe 19 is connected to an upper area of the cylinder of the depressurization chamber 16. A pipe 54 is connected to a lower area of the cylinder of the depressurization chamber 16 for the removal of liquid. This embodiment is particularly compact, most of the prevention device being located above the tank 2.

In one advantageous variant, the pipe 54 is connected to the conservator 8—see the dotted lines in FIG. 10. The available volume of the conservator 8, i.e. the part not taken up by a liquid, is available for receiving liquid from the depressurization chamber 16. An additional rupture element 61 may be arranged on the pipe 54 between the depressurization chamber 16 and the conservator 8. The additional rupture element 61 may be calibrated at a higher rupture pressure than the rupture element 15 upstream of the depressurization chamber 16.

When operating, the head loss in the pipe 54 gives time for the automatic check valve 10 to close during a rupture of the rupture element 15. The conservator 8 collects liquid from the depressurization chamber 16, the automatic check valve 10 being closed.

As illustrated in FIG. 11, the depressurization chamber 16 opens out into the pipe 17 located in the extension of the pipe 26. The pipe 17 enters the conservator 8.

Figure 12:
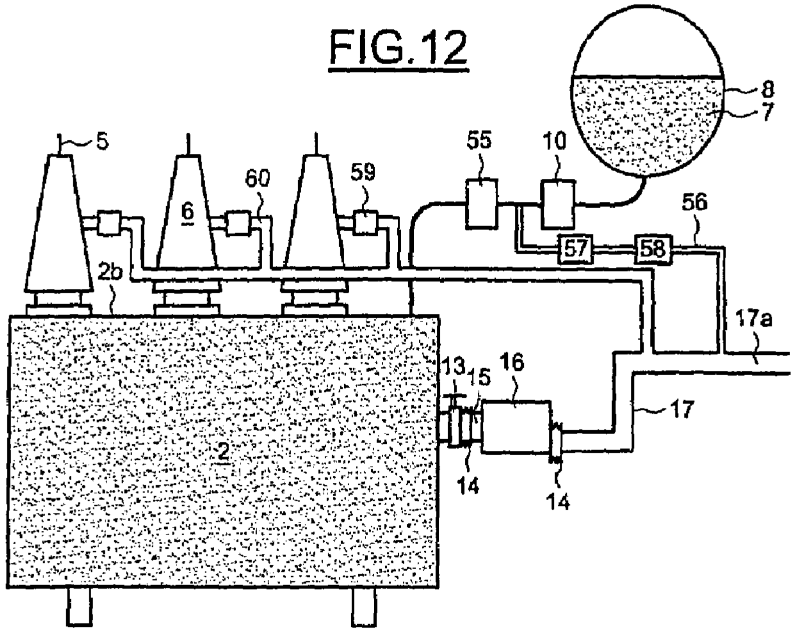
FIGS. 12 and 13 show variants of FIG. 1.

In the embodiment of FIG. 12, the prevention device includes a valve 13 fitted to an outlet of the tank 2 arranged at a point of the body 2*a* located at about between a half and two-thirds of the height of the body 2*a*. The pipe 17 is bent upwards after the depressurization chamber 16 and includes a top portion 17*a* arranged at a level that is higher than that of the windings of the transformer 1. By way of example, the bottom of the top portion 17*a* can be located at about 20 mm above the top end of the windings. Thus, the partial draining and decompression enables the windings to remain immersed and the resulting insulation to be preserved.

The pipe 9 is equipped with a gas detector 55 arranged between the automatic check valve 10 and the lid 2*b* of the tank 2. A pipe 56 connects the pipe 9 and the top portion 17*a* of the pipe 17. The pipe 56 is connected to the pipe 9 between the gas detector 55 and the automatic check valve 10. On the pipe 56 are arranged a manual valve 57, kept in the open position except during maintenance operations, and a solenoid valve 58 controlled by the control unit 23, in the closed position during normal service and in the open position after a pressure relief by the element 15, in order to retrieve inflammable gases present in the pipe 9.

In addition, the bushings 6 with oil insulation are also equipped with a pressure relief element 59 opening out into a pipe 60 connected to the pipe 17. The pressure relief element 59 may be of a similar structure to the pressure relief element 15 and adapted in size. Thus, the tank, the bushings and the on-load tap changer may be equipped with pressure relief elements for increasing the probability of preserving their integrity.

Figure 13:
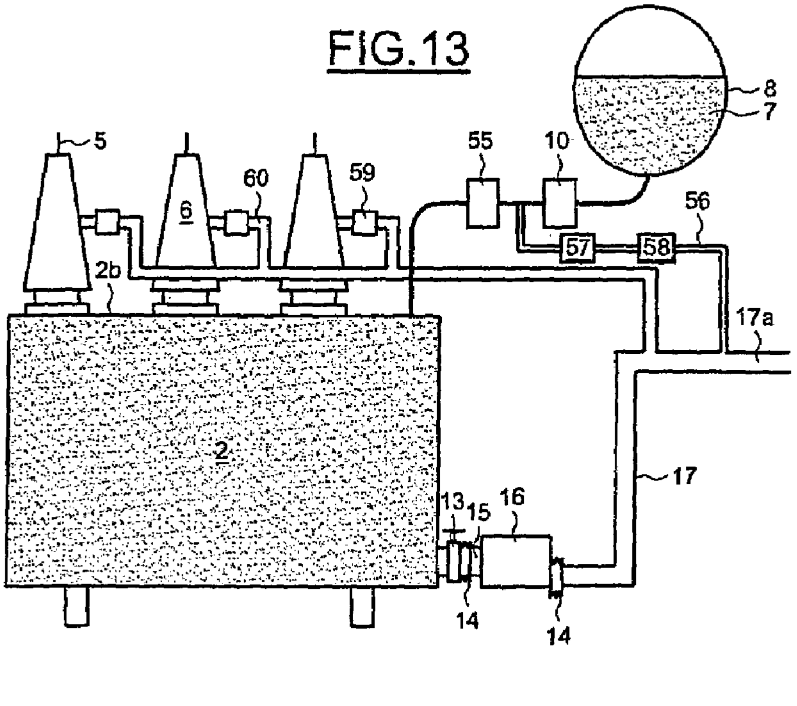

In the embodiment of FIG. 13, the prevention device includes a valve 13 fitted to an outlet of the tank 2 arranged at a low point of the body 2*a*. The pipe 17 is bent upwards after the depressurization chamber 16 and includes a top portion 17*a* as in the previous embodiment.

Such a protection system is economical, independent with respect to neighbouring installations, compact in size and maintenance-free.

The control unit can also be connected to secondary sensors such as the fire detector, vapour sensor (Buchholz) and to the power cubicle trigger sensor for triggering a fire extinguishing process in the event that the explosion prevention system fails. A transformer explosion prevention device is thus provided, requiring very few modifications to the transformer components, which device detects insulation ruptures extremely rapidly and simultaneously takes action so as to limit the resulting consequences, including in confined areas. This has the effect of preventing explosions of oil capacitors and resulting fires, reducing the damage related to short-circuits on the transformer, the on-load tap changers and the bushings.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description to the invention. Changes may be made in the elements described herein without departing from the spirit and scope of the invention as described in the following claims. In addition, it is to be understood that features described herein independently may, in certain embodiments, be combined.

What is claimed is:

1. A device for preventing the explosion of an electric transformer equipped with a tank filled with combustible coolant fluid, comprising: a pressure relief element arranged on an outlet of the tank to decompress the tank; a reservoir arranged downstream of the pressure relief element; at least one manually triggered valve fitted at the outlet of the reservoir such that the reservoir is hermetic in order to collect a fluid that passes through the pressure relief element; and an automatic pressure relief element being fitted at the outlet of the reservoir.

2. The device according to claim 1, further comprising an additional pipe arranged downstream of the pressure relief element.

3. The device according to claim 2, further comprising a flame-arresting element fitted to the additional pipe.

4. The device according to claim 1, wherein the reservoir is equipped with cooling means.

5. The device according to claim 1, further comprising a vacuum pump connected to the reservoir.

6. The device according to claim 1, further comprising a gas pump coupled to the reservoir and an auxiliary reservoir coupled to the gas pump.

7. The device according to claim 1, further comprising a depressurization chamber arranged between the pressure relief element and the reservoir.

8. The device according to claim 1, wherein the pressure relief element includes a perforated rigid disc, an impermeable membrane and a slotted disc.

9. The device according to claim 1, further comprising a plurality of pressure relief elements intended to be coupled to a plurality of transformers, and a reservoir.

10. The device according to claim 1, further comprising a plurality of pressure relief elements intended to be coupled to a plurality of oil capacitors of at least one transformer, and a reservoir.

11. A method for preventing the explosion of an electric transformer equipped with a tank filled with combustible coolant fluid, comprising: decompressing the tank by a pressure relief element; collecting the fluid that passes through the pressure relief element with a hermetic reservoir; removing gases by at least one manually triggered valve; and automatically relieving pressure in the reservoir if the reservoir becomes overpressured.

12. A device for preventing the explosion of an electric transformer equipped with a tank filled with combustible coolant fluid, comprising: a pressure relief element arranged on an outlet of the tank to decompress the tank; a reservoir arranged downstream of the pressure relief element; at least one manually triggered valve fitted at the outlet of the reservoir such that the reservoir is hermetic in order to collect a fluid that passes through the pressure relief element; and a depressurization chamber arranged between the pressure relief element and the reservoir.

* * * * *